United States Patent
Böhm et al.

(10) Patent No.: US 6,234,461 B1
(45) Date of Patent: May 22, 2001

(54) ADJUSTABLE LENGTH GAS SPRING

(75) Inventors: Walter Böhm, Feucht; Frank Weisser, Pegnitz, both of (DE)

(73) Assignee: Suspa Compart Aktiengesellschaft, Altdorf (DE)

( * ) Notice: Subject to any disclaimer, the term of this patent is extended or adjusted under 35 U.S.C. 154(b) by 0 days.

(21) Appl. No.: 09/337,256

(22) Filed: Jun. 22, 1999

(30) Foreign Application Priority Data

Jun. 22, 1998 (DE) .............................. 198 27 657

(51) Int. Cl.[7] .................. F16F 5/00; F16F 9/04
(52) U.S. Cl. ................. 267/64.12; 267/64.19; 267/64.27; 267/123
(58) Field of Search .............. 267/64.27, 64.19, 267/118, 122, 123, 64.12; 188/300

(56) References Cited

U.S. PATENT DOCUMENTS

| 2,729,308 | 1/1956 | Koski et al. |
| 3,588,064 | * 6/1971 | Montanari et al. ............. 267/64.19 |
| 3,656,593 | 4/1972 | Bauer . |
| 4,318,536 | 3/1982 | Bauer . |
| 4,828,231 | * 5/1989 | Fukumura et al. ............... 267/64.19 |
| 4,880,213 | * 11/1989 | Shinbori et al. .................... 267/64.27 |
| 4,890,822 | * 1/1990 | Ezure et al. ...................... 267/64.27 |
| 5,511,759 | * 4/1996 | DeKraker et al. .................... 248/575 |

FOREIGN PATENT DOCUMENTS

| 1 226 833 | 10/1966 | (DE) . |
| 1 430 494 | 4/1970 | (DE) . |
| 29 42 455 | 4/1981 | (DE) . |
| 35 33 386 | 3/1987 | (DE) . |
| 35 33 387 | 3/1987 | (DE) . |
| 40 00 865 | 7/1991 | (DE) . |

* cited by examiner

Primary Examiner—Christopher P. Schwartz
Assistant Examiner—Robert A. Siconolfi
(74) Attorney, Agent, or Firm—Browdy and Neimark

(57) ABSTRACT

An adjustable length gas spring comprises a housing, in which a piston mounted on a piston rod is guided for displacement. The piston divides the housing into two partial volumes. Furthermore, a valve is provided for the interconnection of the partial volumes. A device is provided for closing the valve, by means of which the valve is closed when the partial volume which the piston rod does not pass through reaches a given minimum length.

6 Claims, 2 Drawing Sheets

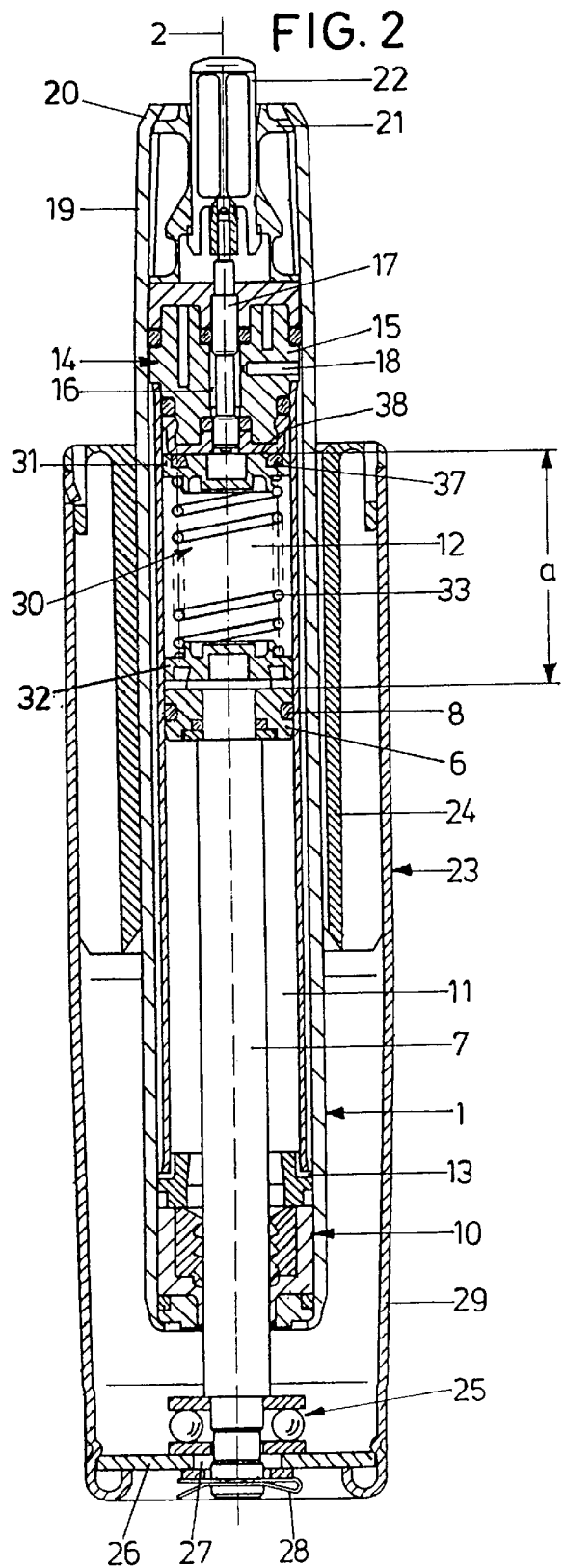
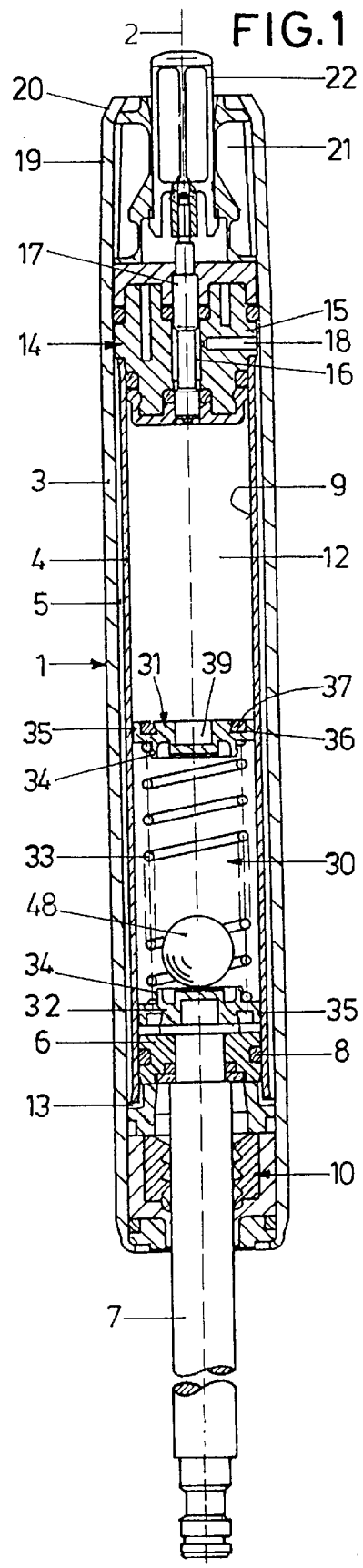

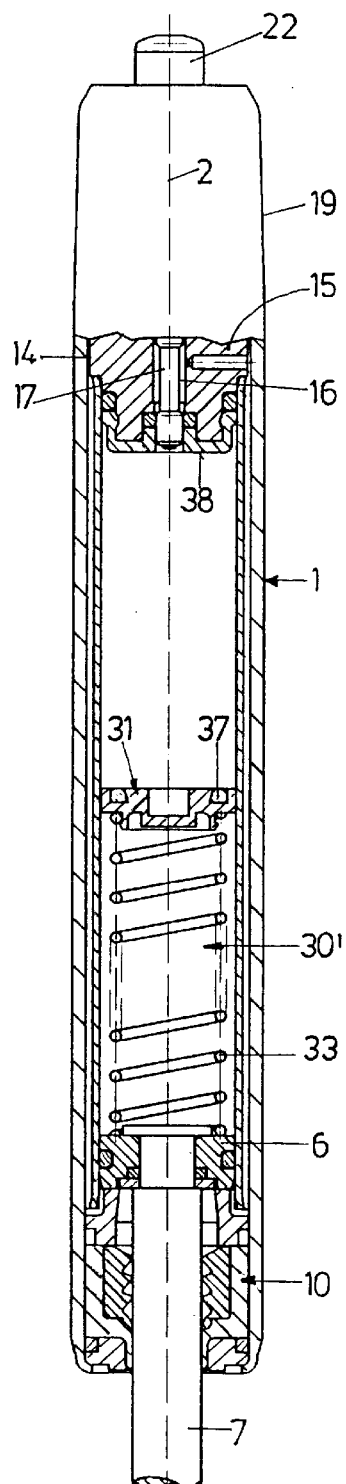
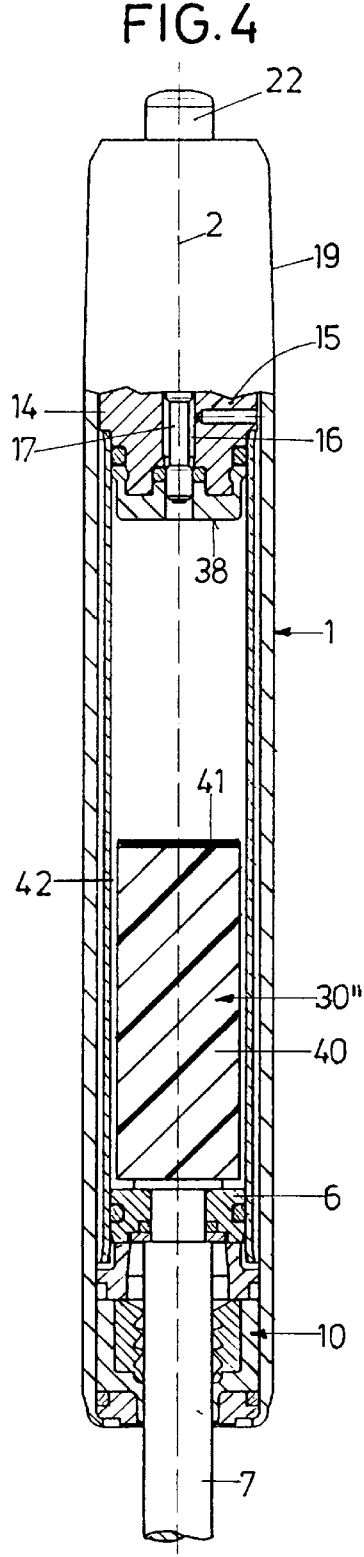
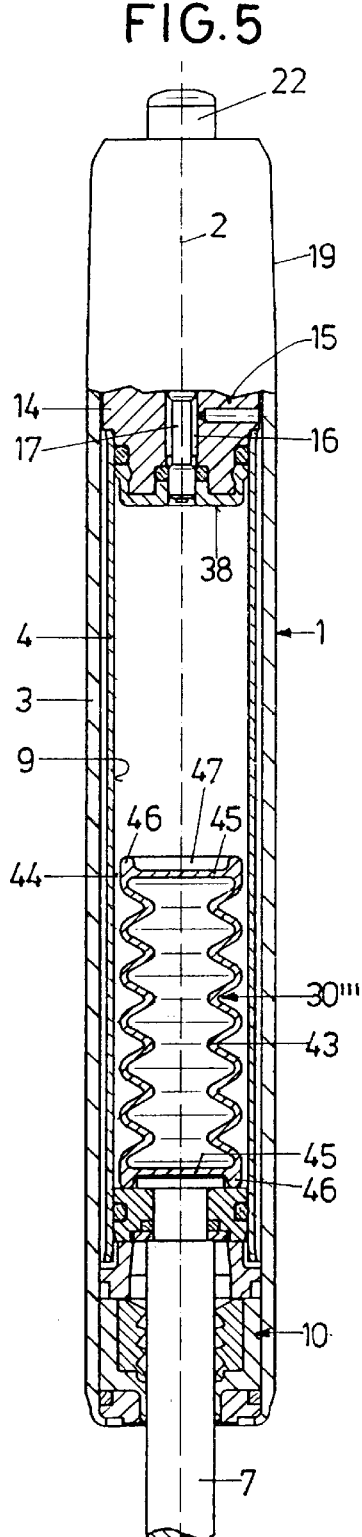

ADJUSTABLE LENGTH GAS SPRING

BACKGROUND OF THE INVENTION

1. Field of the Invention

The invention relates to an adjustable length gas spring comprising a housing, which has a central longitudinal axis; a piston rod extended out of the housing concentrically of the central longitudinal axis; a piston, which is mounted on the piston rod and displaceable in the housing, and which divides the housing into a first partial volume and a second partial volume, the piston rod passing through the first partial volume; and a valve for connecting the partial volumes with each other.

1. Background Art

Adjustable length gas springs of the generic type are known for instance from U.S. Pat. No. 3,656,593 or U.S. Pat. No. 5,915,674 as so-called two-tube gas springs, the housings of which consist of an external cylinder and an internal cylinder, between which forms an annular space. A valve is provided at one end of the housing. A piston rod is extended out of the other end, a piston being disposed on its inside end, dividing the space in the interior cylinder into two partial volumes. Furthermore, adjustable length gas springs of the generic type are designed as so-called single-tube gas springs, in which a valve is formed in the piston and can be actuated from outside through the piston rod.

These known adjustable length gas springs are employed substantially as length adjustment elements in adjustable height chair columns. A problem resides in that when the piston rod is inserted to a large extent into the gas spring, with the valve being closed, the ease and convenience that springiness offers to a user sitting on the chair is low, because breakdown of the gas spring may occur in particular when heavyweight persons sit down on the chair.

To solve this problem, it has become known from U.S. Pat. No. 4,318,536, in a two-tube gas spring, to form a valve space in the partial volume turned towards the valve and to join to the piston a closing element which projects towards the valve space, moves sealingly into the valve space when the piston rod has a given position of insertion and separates the valve space from the partial volume. In this case, a marginal condition consists in that, when the valve space is closed by the closing element, the quotient of the cross-sectional surfaces of the piston ring surface and the surface of the closing element exceeds the quotient of the volume of a remaining space and the volume of the valve space. This helps obtain reliable terminal spring stiffening; however, the constructional requirements are considerable.

SUMMARY OF THE INVENTION

It is an object of the invention to embody an adjustable length gas spring of the generic type so that convenient springiness and terminal spring stiffening are attained by simple means.

According to the invention, this object is attained by the features which consist in that a device for closing the valve is disposed in the second partial volume, closing the valve when a predetermined minimum length of the second partial volume is reached by displacement of the piston. The device according to the invention for closing the valve can be inserted as an additional component into an otherwise unmodified adjustable length gas spring without the need of any special measures. The described breakdown of the gas spring does not occur any longer.

Further features, advantages and details of the invention will become apparent from the ensuing description of four exemplary embodiments, taken in conjunction with the drawing.

BRIEF DESCRIPTION OF THE DRAWING

FIG. 1 is a longitudinal section of an adjustable length gas spring having a first device for closing the valve in a given position of insertion of the piston rod;

FIG. 2 is a longitudinal section of the gas spring of FIG. 1 in a condition incorporated in an upright tube;

FIG. 3 is an illustration of an adjustable length gas spring having a second device;

FIG. 4 is an illustration of an adjustable length gas spring having a third device; and FIG. 5 is an illustration of an adjustable length gas spring having a fourth device.

DESCRIPTION OF THE PREFERRED EMBODIMENTS

The adjustable length gas spring seen in FIGS. 1 to 5 comprises a substantially cylindrical housing 1. It consists of an external cylinder 3 disposed concentrically of the central longitudinal axis 2 and an internal cylinder 4 disposed concentrically within the external cylinder 3, both having a radial distance from each other so that an annular space 5 forms between them. A piston 6 is arranged for displacement in the internal cylinder 4 and mounted on one end of a piston rod 7. By means of a seal 8, the piston 6 is sealed towards the inside wall 9 of the internal cylinder 4. The piston rod 7 is extended out of the housing 1 at one end thereof. For this purpose, it is guided in a seal and guide unit 10, which closes the housing 1 gas-tight at the exit of the piston rod and guides the piston rod 7 concentrically of the axis 2.

The piston 6 divides the interior of the internal cylinder 4 into two partial volumes 11, 12. The partial volume 11 formed between the piston 6 and the seal and guide unit 10 is permanently connected with the annular space 5 by means of at least one overflow port 13.

At the end opposite the piston rod exit, provision is made for a valve 14, by means of which the partial volume 12 formed between the piston 6 and the valve 14 can be connected with the other partial volume 11 and vice versa via the annular space 5 and the overflow port 13. The valve 14 comprises a valve assembly 15, which centers the internal cylinder 4 relative to the external cylinder 3, seals the partial volume 12 towards the annular space 5, fixes the internal cylinder 4 in the direction of the axis 2 and seals the housing 1 to be gas-tight externally. Disposed in the valve assembly 15 is a concentric recess 16, in which a valve operating pin 17 is disposed, projecting outwards from the valve assembly 15. The annular space 5 is in permanent connection with the recess by means of an overflow channel 18. Upon insertion of the valve operating pin 17 from outside into the valve assembly 15 in the direction towards the partial volume 12, the recess 16 is connected with the neighboring partial volume 12, i.e. the valve 14 is opened. In this case, pressurized gas can flow along the way already described from the partial volume 11 to the partial volume 12 and vice versa, whereby length adjustment of the gas spring is possible.

At the end of the housing 1 on the valve side, the external cylinder 3 is formed to have a conically tapering fastening section 19, the edge 20 of which is bent inwards. A spacer 21, which also serves as an abutment for the valve assembly 15, bears against this edge. A slide 22 is flexibly locked into place and held in the spacer 21; it bears against the valve operating pin 17 and serves for the actuation of the operating pin 17 from outside. In as much as the gas spring has been described so far, it is known in its entirety from U.S. Pat. No. 5,915,674 where it is specified in detail, to which reference is made.

The essential field of use of the gas spring results from FIG. 2. FIG. 2 illustrates an adjustable length chair column having an upright tube 23, in which a guide bush 24 is formed concentrically of the axis 2, guiding the housing 1 of the gas spring. The free end of the piston rod 7 located outside the housing 1 is supported via an axial swivel bearing 25 on the bottom 26 of the upright tube 23 and guided through the bottom 26 via an opening 27 therein. It is mounted on the underside of the bottom 26 by means of a securing clip 28. The bottom 26 of the upright tube 23 is followed by a cone section 29, which is inserted into a corresponding hub of a base of a chair. The conically tapering fastening section 19 of the gas spring is inserted into a receptacle on the underside of the seat of a chair. Actuation of the operating pin 17 via the slide 22 takes place by means of a rod assembly mounted on the underside of the seat of the chair. This is generally known and widely spread in practice.

The expulsion forces acting on the piston rod 7 when the valve 14 is opened result from the gas pressure inside the gas spring multiplied by the cross-sectional surface of the piston rod 7. When the valve 14 is closed and a person sits on the chair, then the piston 6 springs by its entire surface against the gas pressure in the upper partial volume 12. Consequently, this force increases more strongly than the expulsion force. In particular when the piston rod 7 with the piston 6 is inserted comparatively deeply into the housing 1 as far as into the proximity of the valve 14, i.e. when the partial volume 12 has become comparatively small, breakdown of the gas spring may occur upon further insertion of the piston rod 7 into the housing 1 with the valve 14 closed. As a consequence, the so-called springiness, i.e. spring compliance while someone sits on a chair, no longer exists. This applies in particular when heavyweight persons sit on the chair.

For such a springiness to be maintained, a device 30 is provided, by means of which the piston rod is prevented from being inserted into the housing 1 beyond a given distance a of the piston 6 from the valve 14. This device 30 also ensures that the partial volume 12 has at least a given length a so that the gas spring possesses the convenient properties of spring compliance even with the valve 14 closed.

In the embodiment according to FIGS. 1 and 2, the device 30 comprises two floating pistons 31, 32, which are freely displaceable in the internal cylinder 4 and between which is disposed a soft helical spring 33, which is locked into place on an annular collar 34 of the floating pistons 31, 32. The floating pistons 31, 32 have sufficient play towards the inside wall 9 of the internal cylinder 4 for a passageway 35 (not seen in the drawing) to form so that pressurized gas can pass from one side of each floating piston 31, 32 to the other. The floating piston 31 turned towards the valve 14 has an annular groove 36 on its side facing the valve assembly 15; an annular seal 37 is disposed in the annular groove 36 and, in an unloaded condition, projects over the floating piston 31. It is disposed concentrically of the axis 2. Its diameter exceeds that of the recess 16 at the exit into the partial volume 12.

Proceeding from the position seen in FIG. 1 with the piston rod 7 extended completely out of the housing 1, when the valve 14 is opened, then the piston rod can be inserted into the housing I against the counterforce mentioned above, because the conditions are the same as if the device 30 were not available. When the floating piston 31 takes its rest on the valve assembly 15 in the position seen in FIG. 2, then the annular seal 37 bears tightly against the surface of the valve assembly 15 that is turned towards it and serves as a sealing face 38. Formed in the floating piston 31 is a clearance zone 39, into which the valve operating pin 17 may move upon opening of the valve 14 without the floating piston 31 being lifted off the sealing face 38. Even when the valve 14 is opened, pressurized gas can neither flow from the partial volume 12 into the valve and further nor can it flow vice versa into the partial volume 12. Consequently, the valve 14 is put out of function and completely closed by the device 30. The helical spring 33 is very soft, i.e. it exercises only a very low force on the piston 6 and thus on the piston rod 7. Its force is only sufficient for the mentioned sealing effect to be reliably exercised when the floating piston 31 bears against the valve assembly 15. The spring 33 does not substantially influence the springiness. So as to ensure that the spring 33 together with the floating piston 31, 32 will again slide downwards to the piston 6, provision can be made for a weight 48 in the form of a ball in the set 31, 32, 33.

In the embodiment according to FIG. 3, the device 30' only differs from the device 30 in that the floating piston 32 resting on the piston 6 has been omitted; the helical spring 33 supports itself directly on the piston 6.

In the embodiment according to FIG. 4, the device 30" is substantially a spring 40 of foamed material consisting of a cylindrical block of open-cell foam, for example open-cell polyurethane foam. This is a so-called integral foam which, at least on its circular surface turned towards the valve 14, is provided with a so-called cast skin, i.e. an air-impermeable, but elastic layer 41, which bears tightly against the valve assembly 15 when the spring 40 bears against the sealing face 38 of the valve assembly 15 and precludes the described escape of gas from the valve 14 into the partial volume 12 and vice versa. Towards the inside wall 9 of the internal cylinder 4, the spring 40 has a clearance which constitutes a passageway 42 so that the gas can flow past the layer 41 into the cells of the spring 40 of foamed material and vice versa. As seen in FIG. 4, in this embodiment, the valve operating in 17 is disposed to be countersunk in the valve assembly 15 so that the operating pin 17 does not move out of the valve assembly 15 into the partial volume 12 when the valve 14 is opened. Instead of an open-cell foam, a corresponding open-cell rubber may be used as a material for the spring 40.

In the embodiment according to FIG. 5, the device 30'" consists of a closed rubber bellows spring 43 equally disposed to have some play towards the inside wall 9 of the internal cylinder 4, this play forming a passageway 44. The ends of the spring 43 are provided with a closing plate 45, from which an annular sealing rib 46 stands out in the direction towards the valve assembly 15. Upon insertion of the piston 6 into the housing 1, this annular sealing rib 46 takes its bearing on the sealing face 38 in the way specified, putting the valve 14 out of function. In this case, the part of the valve operating pin 17 which stands out of the valve assembly 15 when the valve 14 is opened is situated in the clearance zone 47 located within the rib 46.

Of course, the mentioned device 30, 30', 30", 30'" can also be used in single-tube adjustable length gas springs, in which the valve is disposed in the piston and is actuated externally by an operating mechanism arranged in the piston rod. Adjustable length gas spring of this type are used in adjustable length chair columns in such a way that the piston rod is extended upwards, carrying the seat. These adjustable-length gas springs are also known to a wide extent. In the case of such a design, the device 30, 30', 30", 30'41 is located in the partial volume between the piston which has the valve and the closed lower end of the housing, i.e. again not in the partial volume through which passes the piston rod.

What is claimed:

1. An adjustable length gas spring comprising
   a housing (1), which has a central longitudinal axis (2) and an inside wall (9) and which is filled with pressurized gas and closed in a gas tight manner;
   a piston rod (7) extended out of the housing (1) concentrically of the central longitudinal axis (2);
   a piston (6), which is mounted on the piston rod (7) and displaceable in the housing (1), and which divides the housing (1) into a first partial volume (11) and a second partial volume (12), the piston rod (7) passing through the first partial volume (11) and emerging at a first end of the housing (1); and
   a valve (14) at a second end of the housing (1) for connecting the partial volumes (11, 12) with each other when opened and causing a springiness when closed and dividing the first and second partial volumes from each other;
   wherein a device (30, 30', 30" and 30'41) for closing the valve (14) is disposed in the second partial volume (12), closing the valve (14) when a predetermined minimum length (a) of the second partial volume (12) is reached by displacement of the piston (6);
   wherein the device (30, 30', 30" and 30'41) comprises a sealing member which bears elastically tightly against the valve (14) when the predetermined minimum length (a) of the second partial volume (12) is reached and which defines a passageway (35) between the inside wall (9) and the sealing member;
   wherein the device (30, 30', 30" and 30'41) comprises a soft spring (33, 40, 43) with the sealing member with a seal (37, 41 46) which takes its bearing on a sealing face (38) of the valve (14) with a force which is only sufficient to provide a sealing effect between the sealing member and the sealing face (38) but does not substantially influence the springiness even if the valve (14) is opened.

2. A gas spring according to claim 1, wherein the spring is a helical spring (33) which, at least on a side facing the valve (14), is provided with a floating piston (31), which has an annular seal (37) turned towards and allocated to the sealing face (38) of the valve (14).

3. A gas spring according to claim 1, wherein the spring is a rubber bellows spring (43).

4. A gas spring according to claim 3, wherein, at least on a side facing the valve (14), the rubber bellows spring (43) is provided with an annular sealing rib (46) for resting on the sealing face (38) of the valve (14).

5. A gas spring according to claim 1, wherein the spring is a spring (40) of open-cell foamed material.

6. A gas spring according to claim 5, wherein, on a side facing the valve (14), the spring (40) of foamed material is provided with a gas-tight elastic layer (41) for resting on the sealing face (38) of the valve (14).

* * * * *

UNITED STATES PATENT AND TRADEMARK OFFICE
CERTIFICATE OF CORRECTION

PATENT NO.    : 6,234,461 B1
DATED         : May 22, 2001
INVENTOR(S)   : Walter Boehm et al.

It is certified that error appears in the above-identified patent and that said Letters Patent is hereby corrected as shown below:

<u>Title page,</u>
Item [73], Assignee, delete "Suspa Compart Aktiengesellschaft" and insert therefor -- SUSPA Holding GmbH --.

Signed and Sealed this

Thirtieth Day of December, 2003

JAMES E. ROGAN
*Director of the United States Patent and Trademark Office*